United States Patent [19]

Woodhead et al.

[11] Patent Number: 4,548,832
[45] Date of Patent: Oct. 22, 1985

[54] MATERIALS

[75] Inventors: James L. Woodhead, Didcot; Keith T. Scott; Alan Wilcockson, both of Newbury, all of England

[73] Assignee: United Kingdom Atomic Energy Authority, London, England

[21] Appl. No.: 476,483

[22] Filed: Mar. 18, 1983

[30] Foreign Application Priority Data

Mar. 19, 1982 [GB] United Kingdom ............... 8208088

[51] Int. Cl.$^4$ .................. B05D 1/10; C04B 35/12; C04B 35/48

[52] U.S. Cl. .................................. 427/34; 264/13; 427/423; 428/402; 428/403; 501/12; 501/102; 501/103; 501/104; 501/105

[58] Field of Search ............... 427/34, 423; 501/103, 501/104, 105, 12, 102; 264/13; 428/402, 403

[56] References Cited

U.S. PATENT DOCUMENTS

| | | | |
|---|---|---|---|
| 2,984,576 | 5/1961 | Alexander et al. | 501/103 |
| 3,758,316 | 9/1973 | Sowards | 501/102 |
| 4,025,350 | 5/1977 | Walters et al. | 501/103 |
| 4,102,691 | 7/1978 | Walters et al. | 501/103 |
| 4,166,753 | 9/1979 | Emblem et al. | 501/103 |
| 4,389,251 | 6/1983 | Simm et al. | 427/34 |
| 4,415,673 | 11/1983 | Feagin | 501/102 |
| 4,450,184 | 5/1984 | Longo et al. | 427/34 |

FOREIGN PATENT DOCUMENTS

| | | |
|---|---|---|
| 1266494 | 3/1971 | United Kingdom . |
| 1286257 | 8/1972 | United Kingdom . |
| 1302223 | 1/1973 | United Kingdom . |
| 1472431 | 5/1977 | United Kingdom . |
| 2034678A | 6/1980 | United Kingdom . |
| 1584366 | 2/1981 | United Kingdom . |

OTHER PUBLICATIONS

Sanders, *Chemical and Engineering News*, Jul. 9, 1984, pp. 26-29 and 31-40.

*Primary Examiner*—James C. Cannon
*Attorney, Agent, or Firm*—Larson and Taylor

[57] ABSTRACT

The present invention relates to materials and more particularly to particulate materials suitable for use as thermal spraying powders.

There is disclosed a process for the preparation of a particulate material suitable for use as a thermal spraying powder which includes treating a mixture comprising an inorganic substance as a major component (as defined in the Specification) and a sol to gel the sol thereby to form an intermediate material comprising inorganic substance and gel and heating the intermediate material.

One example of thermal spraying is plasma spraying.

14 Claims, No Drawings

MATERIALS

The present invention relates to materials and more particularly to particulate materials suitable for use as thermal spraying powders.

According to one aspect of the present invention there is provided a process for the preparation of a particulate material suitable for use as a thermal spraying powder which includes treating a mixture comprising an inorganic substance as a major component (as hereinafter defined) and a sol to gel the sol thereby to form an intermediate material comprising inorganic substance and gel and heating the intermediate material.

The term "thermal spraying" as used in this Specification includes plasma spraying, flame spraying and detonation gun spraying.

Preferably the mixture is treated to gel the sol in a manner such that the intermediate material is particulate. Thus, for example, the mixture may be spray dried or may be dispersed in an immiscible liquid and subjected to the influence of a gelling reagent in a manner similar to that disclosed in British Pat. No. 1266494 (UKAEA). The gelling reagent may be, for example, a base such as ammonia or a base which is soluble in the immiscible liquid and is capable of extracting anions from the sol in the mixture to effect gelling thereof (e.g. a long chain aliphatic amine such as Primene JMT).

It will be appreciated that the heating of the intermediate material is carried out so that the particulate material product is refractory in nature.

The inorganic substance may be in any convenient form (e.g. an aqueous solution of the inorganic substance or the inorganic substance may be in powder form). For example, the inorganic substance may be an inorganic oxide powder such as alumina, ceria, titania, chromia, magnesia, or zirconia.

Where the inorganic substance is in powder form the powder may conveniently have a small particle size (e.g. $\leq 1\mu$).

The sol is preferably a zirconia sol (e.g. a zirconia sol prepared in accordance with British Pat. No. 1181794 (UKAEA)). $Y_2O_3$ optionally may be present in the zirconia sol.

The presence of $Y_2O_3$ could be used to stabilise any free $ZrO_2$ remaining after thermal spraying thus inhibiting any undesirable phase change in $ZrO_2$ which may take place at elevated temperature.

It will be appreciated that where the inorganic substance is in powder form and the intermediate material is a particulate intermediate material, the particulate intermediate material will comprise particles of the inorganic substance bound together by the gel formed from the sol. Also it will be appreciated that in accordance with the present invention the sol produces a gel which acts as a carrier for the inorganic substance.

The use of a colloidal dispersion in the preparation of powders for flame and plasma spraying is known per se. However, in such a known preparation the colloidal dispersion is used in relatively large proportions because it is the source of the major component of the product. (For example, an alumina sol may be gelled to form an alumina plasma spraying powder).

In contrast in accordance with the present invention the sol is not the major constituent of the mixture. Thus, it is to be understood that "inorganic substance as a major component" in this Specification means that there is more inorganic substance in the mixture than there is sol.

Conveniently the sol comprises 20% or less of the mixture.

If it is desired that the thermal spraying powder should contain the maximum amount of inorganic substance the proportion of sol in the mixture may be chosen to be as small a proportion of the mixture as is consistent with forming an intermediate material in accordance with the present invention, comprising inorganic substance and gel, for heating to give a thermal spraying powder in accordance with the present invention (i.e. the sol may be as small a proportion as is consistent with forming a gel sufficiently to act as a carrier for the inorganic substance).

The relative amounts of inorganic substance and sol in the mixture may be varied over a wide range depending upon the desired composition of the particulate material to be formed.

When the inorganic substance is in powder form and it is desired to form a particulate intermediate material there must clearly be enough sol in the mixture to enable a gel of sufficient strength to be formed to bind the inorganic substance powder together in a plurality of discrete particles which are robust enough to be handled.

The lower limit on the amount of sol can be readily determined by experimentation for a given combination of inorganic substance and sol. Typically when using a zirconia sol 5 to 10 w/o of sol in the mixture is sufficient with most inorganic substances to produce discrete particles which are robust enough to be handled subsequently to formation.

The present invention may be used to prepare a particulate material in the form of a free flowing powder. The particle size is conveniently between $10\mu$ to $70\mu$ and preferably between $10\mu$ to $25\mu$ where it is desired to fabricate thin smooth plasma spray coatings of high density.

Certain inorganic materials have a high vapour pressure under thermal (e.g. plasma) spraying conditions which renders them inconvenient or difficult or hazardous to use in thermal spraying. It is to be understood that in this Specification the term "high vapour pressure" when applied to an inorganic substance for thermal spraying means that the inorganic substance per se is inconvenient or difficult or hazardous to use in thermal spraying in view of its vapour pressure under thermal spraying conditions (e.g. under plasma spraying conditions).

For example, MgO is a difficult substance to plasma spray because of its high vapour pressure. By way of further example, the plasma spraying of chromia ($Cr_2O_3$) is rendered hazardous since chromia has a high vapour pressure and gives rise to the production of toxic fumes.

The present invention may be applied such as to enable substances having a high vapour pressure to be plasma sprayed.

In accordance with another aspect of the present invention there is provided a particulate material suitable for use as a thermal spraying powder comprising an inorganic substance having a high vapour pressure and a refractory material formed from a gel by heating.

The inorganic substance having a high vapour pressure may be in powder form and thus the particulate material may comprise particles of inorganic substance bound together by refractory material formed from a gel by heating.

According to a further aspect of the present invention there is provided a process for the preparation of a particulate material suitable for use as a thermal spraying powder which includes treating a mixture comprising an inorganic substance having a high vapour pressure as a major component and a sol to gel the sol and thereby to form an intermediate material comprising inorganic substance and gel and heating the intermediate material.

The invention also provides in accordance with a further aspect a process comprising thermal spraying a particulate material comprising an inorganic substance having a high vapour pressure and a refractory material formed by heating a gel.

In accordance with the immediately preceeding aspect of the present invention the inorganic substance and refractory material may be thermal sprayed (e.g. plasma sprayed) in globular form.

Also in accordance with the immediately preceeding aspect of the present invention the thermal spraying may be effected to form a coating on a substrate.

It has been found that, in accordance with the present invention, particulate material containing zirconia and a relatively small quantity of $Al_2O_3$ can be used to form plasma sprayed coatings which have better impact resistance than conventional coatings.

The present invention may also be applied to reduce dust hazard (e.g. with $Cr_2O_3$) prior to thermal spraying and poor flow properties and toxic fume hazard during thermal spraying. Thus, for example conventional $Cr_2O_3$ thermal spraying powders are prepared by a process involving a crushing step. This gives rise to a proportion of very fine material which can present a dust hazard and give poor flow properties. The present invention avoids the need for a crushing step.

In accordance with the present invention particulate material containing zirconia and up to 95 w/o MgO has been plasma sprayed to produce satisfactory coatings and free-standing artefacts.

The invention also provides a particulate material suitable for use as a thermal spraying powder whenever prepared by a process in accordance with the invention.

By way of example, it has been found in accordance with the present invention that with a zirconia sol/$Cr_2O_3$ powder mixture 10 to 70$\mu$ particles may be formed at a modest stirring rate using an immiscible liquid (trichloroethane (ex ICI) and a surfactant) with a mixture : immiscible liquid ratio of 1:3.

The invention will now be further described, by way of example only, as follows: CL EXAMPLE 1

A 0.204 l volume of zirconia sol (prepared in accordance with British Pat. No. 1181794 (UKAEA)) and having the following characteristics : 495 g $ZrO_2$ $l^{-1}$; viscosity 23 cp; density 1.60 g $cm^{-3}$) was diluted to 0.760 l with water and 0.90 Kg of chromia powder (Hopkin and Williams reagent grade particle size < 1 $\mu$m) was added. The sol and powder were mixed for 5 minutes using a Silverson mixer to give a viscous, paint-like mixture having the following characteristics: density 1.90 g $cm^{-3}$; viscosity 3.6 poise; concentration 1000 g $l^{-1}$ (total oxide).

The mixture showed no significant sedimentation after 30 minutes and after 16 hours at $\sim 23°$ C. the sediment formed was readily redispersible by gentle shaking (supernate pH 1–2; conductivity 54 mmhos).

The mixture prepared in this Example had the composition 10 w/o $ZrO_2$–$Cr_2O_3$.

EXAMPLE 2

A mixture prepared in accordance with the procedure of Example 1 (0.50 l, $\sim 0.9$ Kg oxide) was added to a gently stirred immiscible liquid (1.5 l, trichloroethane "Geneklene" ex ICI) containing a surfactant (Span 80) and the rate of stirring then increased to give spherical droplets in the desired size range.

Stirring was continued for 3 minutes and ammonia gas introduced at a flow-rate of 0.2 l $min^{-1}$ for 3 to 4 minutes to gel the droplets to give gel particles.

The supply of ammonia gas was stopped and gentle stirring continued for a few minutes to allow gel particles in the immiscible liquid to harden. After settling (16 h at 22° C.) supernatant liquid, predominantly "Genklene" and water, was decanted off and the gel particles filtered under suction. The gel particles, which were substantially spherical in shape, were dried at 105°–200° C. to remove Genklene and the majority of contained water.

The dried gel particles were heated 100° C./hr for the first 3 hours and then at 500° C./hr up to 1000° C. and held there for 1.5 hours.

EXAMPLE 3

The procedure of Example 2 was followed with the exception that the composition of the mixture was adjusted to give a final particle material product having a composition of 20 w/o $ZrO_2$–$Cr_2O_3$.

The gel particles produced using a feed mixture appropriate to this composition required washing with water to remove entrained ammonium nitrate prior to heating in order to avoid loss of product by "boiling".

Thus 20 w/o $ZrO_2$–$Cr_2O_3$ gel particles were given a single hot water wash. Approximately 1.3 Kg dry gel were stirred with 3 l of water containing a small quantity of ammonia for 3 minutes and then filtered under suction.

Analysis showed that $\sim 70\%$ of the nitrate was removed by this washing. The air dried gel particles were heated at 100° C./hr for the first 3 hours and then at 500° C./hr to 1000° C. and held there for 1.5 hours.

EXAMPLE 4

Samples of particulate materials of 10 w/o $ZrO_2$–$Cr_2O_3$ prepared in accordance with the procedure of Example 2 were compared with two commercially available powders in respect of plasma spraying properties.

The particulate materials prepared in accordance with the present invention showed superior powder flow properties, deposit efficiency and bond strength. One commercially available powder had a deposit efficiency of 50.4% and a bond strength of 5.2 MPa when plasma sprayed under a given set of conditions whereas corresponding figures for particulate material in accordance with the present invention were 59.2% and 9.1 MPa respectively when plasma sprayed under the same conditions. Similarly under another set of plasma spraying conditions a second commercially available powder gave figures of 52.0% and 6.8 MPa whereas the particulate material gave 63% and 12.9 MPa under the same conditions of plasma spraying.

Compared with conventional powders the use of particulate materials in accordance with the present invention give a visually much reduced fuming during plasma spraying and much less deposit on the support equipment after spraying.

EXAMPLE 5

A mixture was formed by mixing a zirconia sol (prepared in accordance with British Pat. No. 1181794 (UKAEA) (3.88M) with an aqueous solution of AR grade magnesium nitrate (3.9M) in proportions appropriate to obtaining a zirconia/magnesia product having 95 w/o magnesia.

The mixture did not coagulate.

EXAMPLE 6

A mixture prepared as in Example 5 was dispersed as droplets in 1:1:1 trichloroethane containing a surfactant (Span 80) by stirring and Primene JMT (a long chain aliphatic amine) was added. Nitrate ions were extracted from the droplets and the droplets thereby caused to gel.

The resulting gel particles were filtered off, washed, dried and calcined to give to free flowing powder.

Plasma spraying of the powder gave white well bonded deposits.

We claim:

1. A process for the preparation of a particulate material suitable for use as a thermal spraying powder which includes treating a mixture comprising chromia as a major component and a zirconia sol to gel the sol thereby to form a particulate intermediate material comprising chromia and zirconia gel and heating the intermediate material to produce a particulate material suitable for use as a thermal spraying powder.

2. A process as claimed in claim 1 wherein the mixture is spray dried to gel the sol.

3. A process as claimed in claim 1 wherein the mixture is dispersed in an immiscible liquid and subjected to the influence of a gelling agent to gel the sol.

4. A process as claimed in claim 3 wherein the gelling reagent comprises ammonia or a base capable of extracting anions from the sol in the mixture to effect gelling thereof.

5. A process as claimed in claim 1 wherein the chromia is in the form of an aqueous solution.

6. A process as claimed in claim 1 wherein the chromia is in the form of a powder.

7. A process as claimed in claim 6 wherein the chromia powder has a particle size of $\leq 1\mu$.

8. A process as claimed in claim 1 wherein the mixture contains less than 20% w/o zirconia sol.

9. A process as claimed in claim 8 wherein the mixture contains 5 to 10 w/o zirconia sol.

10. A process as claimed in claim 1 wherein the mixture also contains $Y_2O_3$.

11. A process as claimed in claim 1 wherein the product particulate material has a particle size between $10\mu$ to $70\mu$.

12. A process as claimed in claim 11 wherein the product particulate material has a particle size between $\mu$ to $25\mu$.

13. A process comprising thermal spraying a particulate material comprising chromia and zirconia formed by heating a zirconia gel, said gel being formed from a mixture of a zirconia sol and a major amount of chromia.

14. A particulate material suitable for use as a thermal spraying powder comprising chromia and zirconia formed from a zirconia gel by heating, said gel being formed from a mixture of a zirconia sol and a major amount of chromia.

* * * * *